Nov. 10, 1953 A. E. CANFORA 2,658,950

REPRODUCER FOR MAGNETICALLY RECORDED SIGNALS

Filed Aug. 31, 1948

INVENTOR
ARTHUR E. CANFORA
BY Morris A. Rabkin
ATTORNEY

Patented Nov. 10, 1953 2,658,950

UNITED STATES PATENT OFFICE 2,658,950

REPRODUCER FOR MAGNETICALLY RECORDED SIGNALS

Arthur E. Canfora, Brooklyn, N. Y., assignor to Radio Corporation of America, a corporation of Delaware Application August 31, 1948, Serial No. 46,948

6 Claims. (Cl. 179—100.2)

My present invention relates to the art of transcribing magnetically-recorded signals and has for its principal object to provide an improved apparatus for deriving from a slowly moving magnetic-record signals that were originally recorded on said record at a high speed.

The prior art is replete with so-called "telegraphone" systems wherein the recording apparatus is so arranged that signals (for example, telegraph signals) are registered at high speeds on a magnetic record and later reproduced at speeds convenient for transcribing. In all such systems the voltage induced in the pick-up device of the reproducing unit is a function of the change of flux linkage per unit of time and this fact has heretofore imposed a lower limit (of say, two feet per second) upon the playback-speed at which the tape or other record may be run past the said polar extremities of the said unit. In modern practice the trend has been toward higher and yet higher recording (and hence reproducing) speeds since, as is well known, the higher the speed of the record, the higher is the possible recording frequency. Some types of mechanical equipment (e. g. telegraph-printers) simply cannot operate at the play-back speeds required to transcribe such high-frequency recordings into intelligible signals.

Accordingly, a specific object of my present invention is to provide a telegraphone reproducing device capable of useful operation at playback speeds slower than those heretofore possible of practical achievement.

My invention is predicated upon an appreciation of the fact that since the magnitude of the voltage induced in a telegraphone pick-up device is a function of the change of flux-linkage (between the signal-bearing magnetic-record and the pick-up) per unit of time, it is immaterial whether the change in flux linkage is achieved by pulling the signal-bearing magnetic-record across (or through) the gap of a stationary pick-up magnet at a rapid rate or whether the required change in flux-linkage per unit of time is produced by some other type of rapid relative movement between the pick-up magnet and the record. Thus, by imparting a controlled vibrational-type of relative movement between the pick-up device and the signal-bearing magnetic-record I am able to achieve an increase in the magnitude of the signal-voltage induced in the pick-up device without any increase in the linear speed of the record and, of more importance, am able to transcribe intelligible signals when the speed of the record has been reduced to but a few inches per second.

Figure 1:
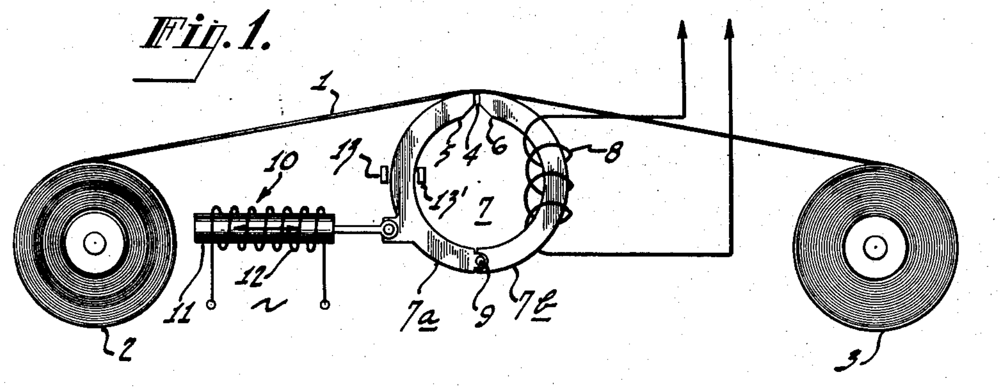
Figure 2:
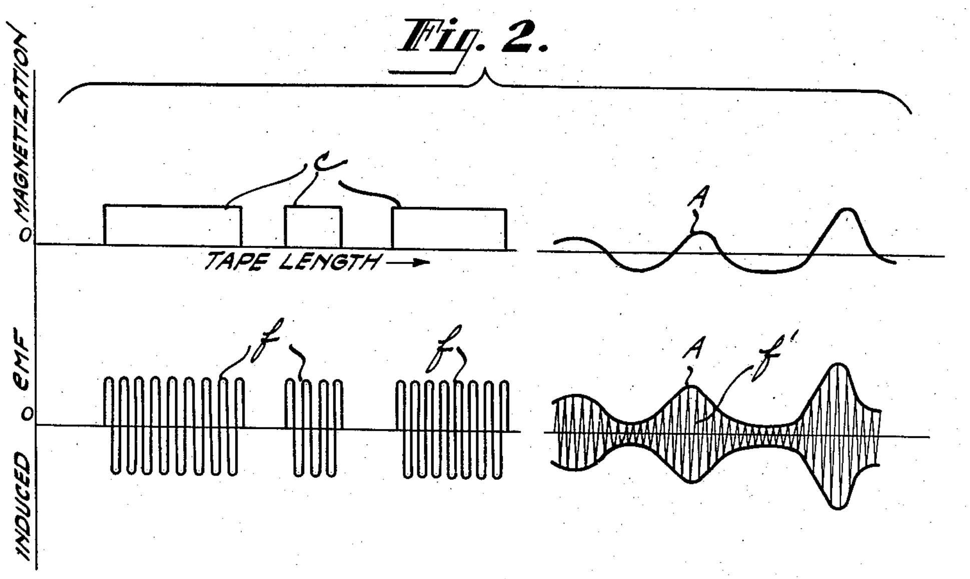

My invention is described with particularity in connection with the accompanying drawing, wherein:

Fig. 1 is a partly diagrammatic elevational view of a telegraphone including a magnetic pick-up which has been modified in accordance with my invention to vibrate between predetermined fixed limits at a predetermined frequency and Fig. 2 is a chart showing the effect of the said controlled vibratory movement upon the reproduction of direct current (e. g. "code") and audio frequency (e. g. "voice") signals from the telegraphone-record.

In the embodiment of my invention which I have selected for purposes of illustration, 1 designates a signal-bearing reelable (tape or wire) magnetic-record which is wound to run between a storage reel 2 and a take-up reel 3 in a path that spans the air-gap 4 between the polar extremities 5 and 6 of a telegraphone pick-up unit comprising a magnet 7 and a coil 8. In accordance with my invention, the magnet 7 is of bi-part construction and comprises a movable arm 7a which is connected to a stationary arm 7b preferably at a point opposite to the air gap 4 as by means of a magnetically permeable hinge 9. The movable arm 7a of the magnet is arranged to be driven at a controlled, preferably constant, rate by an electro-mechanical vibrator 10. The frequency of the vibrator 10 may be changed by changing the frequency of the alternating field established through its magnetic core 11 by the current applied to its coil 12 from a suitable source of alternating current, not shown.

The particular frequency of vibration employed will ordinarily be determined by the type of signal upon the record. Thus, the presence of an audio-frequency signal (A, Fig. 2) upon the magnetic record 1 will dictate the use of a super-audible frequency of vibration, while a direct current code signal (C, Fig. 2) upon the record permits the use of a much lower frequency, say, 1300 cycles per second. The amplitude of the vibrations applied to the movable arm 7a of the magnet is preferably kept within adjustably-fixed limits by mechanical stops 13, 13' disposed on opposite sides of the said arm.

The vibrating movement of the magnet arm 7a alters the dimensions of the air gap 4 between the polar extremities 5 and 6 of the magnet and hence alters the reluctance of the path through the magnetic circuit and changes the number of flux lines passing through the coil 8. This procedure makes available an alternating voltage in the pick-up 8. When a mark or magnetized portion of the tape is passed across (or through)

the air gap 4 of the magnet then the frequency of this voltage is the same as the frequency used in the vibrator and is independent of tape speed. In Fig. 2 the sine wave *f* beneath the D. C. code signal C, and the modulated sine wave *f'* beneath the A. C. audio signal A, show the output of the pick-up coil 8 in relation to the magnetized state of the tape as shown in the upper lines of the said drawing.

I of course appreciate that the playing speed at which a magnetic record can be satisfactorily transcribed is a function not only of the speed at which it was recorded but of other factors (e. g. keying frequency, pole piece spacing etc.) as well. However, in applying the apparatus of my invention to transcribing signals from magnetic records which required a playback speed of upwards of two feet per second when played back in a conventional telegraphone, I have achieved playback speeds of the order of from three to six inches per second.

From the foregoing it will be apparent that my invention provides a telegraphone reproducing device capable of useful operation at play-back speeds slower than those heretofore possible of practical achievement.

I claim:

1. In a magnetic phonograph for reproducing the signals on a signal-bearing magnetic record, means for moving said record at a substantially constant linear speed along a predetermined path, a signal pick-up magnet having polar extremities movable with respect to each other and mounted adjacent to said path in a position to be magnetically influenced by the signals upon said moving record, and a vibrator mechanically coupled to said magnet for imparting controlled vibrational movement to said polar extremities of said magnet.

2. A magnetic pick-up for use with a relatively moving signal-bearing magnetic record, said pick-up comprising, in combination, a signal pick-up magnet having polar extremities movable with respect to each other and defining an air gap of variable dimensions across which said record is adapted to be moved, and means for moving said polar extremities of said magnet with respect to each other at a predetermined frequency.

3. A system for utilizing a pick-up magnet having a non-magnetic gap between the polar extremities thereof for translating signals recorded at a high speed upon a rapidly moving magnetic record, said system comprising, a magnetic pick-up head having a non-magnetic gap therein variable in dimensions, means for moving said signal-bearing record across said non-magnetic gap relatively slowly at a constant rate, and means for continuously varying the dimensions of said gap between predetermined fixed limits at a predetermined frequency.

4. A system for varying the amplitude of the voltage induced in a pick-up device of a telegraphone reproducing unit from a magnetic record containing direct-current signals, said system comprising a pick-up device having a gap therein adapted to be varied in dimensions, means for moving said record at a substantially constant linear rate with respect to said pick-up device, and means for imparting sustained variations in the dimensions of said gap of a predetermined frequency within the audible range.

5. The system in accordance with claim 4 and wherein the frequency of said sustained variation is of the order of about 1300 cycles per second.

6. A system for varying the amplitude of a voltage induced in a pick-up device of a telegraphone reproducing unit from a magnetic record containing alternating current signals, said system comprising a pick-up device having a gap therein adapted to be varied in dimensions, means for moving said record at a substantially constant linear rate with respect to the gap in said pick-up device, and means for imparting sustained variations in the dimensions of said gap of a predetermined frequency.

ARTHUR E. CANFORA.

References Cited in the file of this patent

UNITED STATES PATENTS

| Number | Name | Date |
|---|---|---|
| 1,325,574 | Nichols | Dec. 23, 1919 |
| 2,373,560 | Hanert | Apr. 10, 1945 |
| 2,423,339 | Newman | July 1, 1947 |
| 2,424,295 | Williams | July 22, 1947 |
| 2,587,593 | Camras | Mar. 4, 1952 |